May 2, 1933.　　　　　N. L. GREENE　　　　　1,906,576
SUPPORT FOR RECORDING DEVICES
Filed Dec. 22, 1930　　　　2 Sheets-Sheet 1
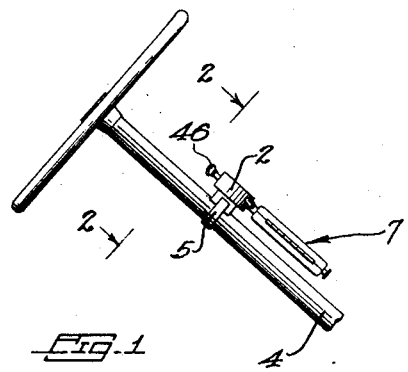
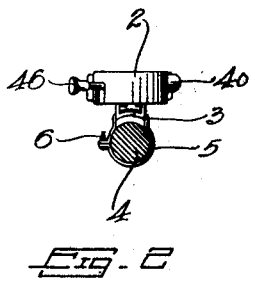
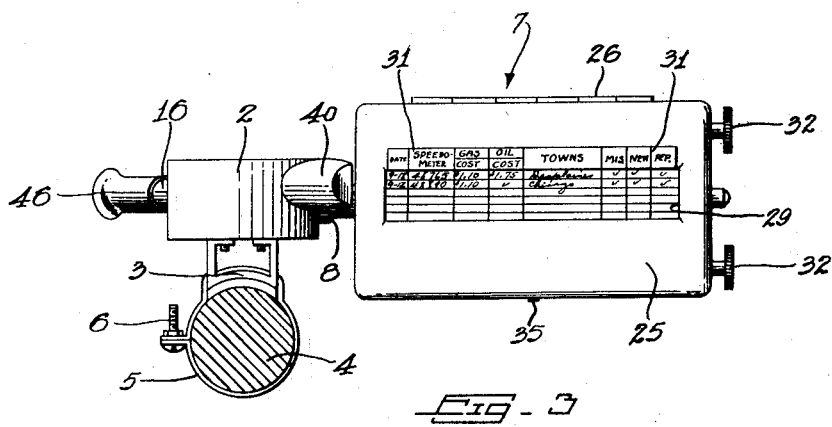
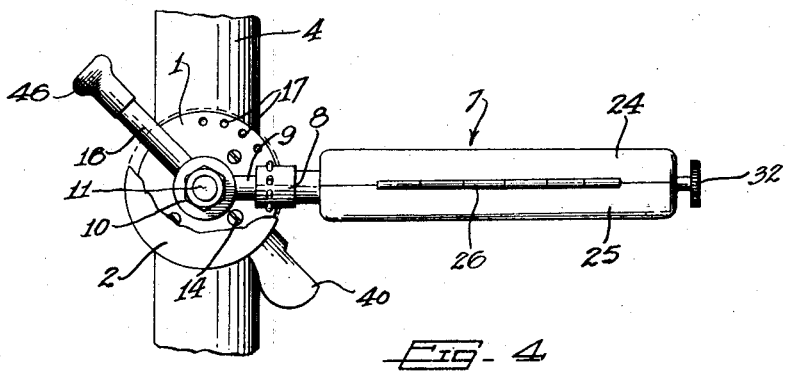
Nelson L. Greene
INVENTOR
BY *Munn & Co.*
ATTORNEYS May 2, 1933.  N. L. GREENE  1,906,576
SUPPORT FOR RECORDING DEVICES
Filed Dec. 22, 1930   2 Sheets-Sheet 2
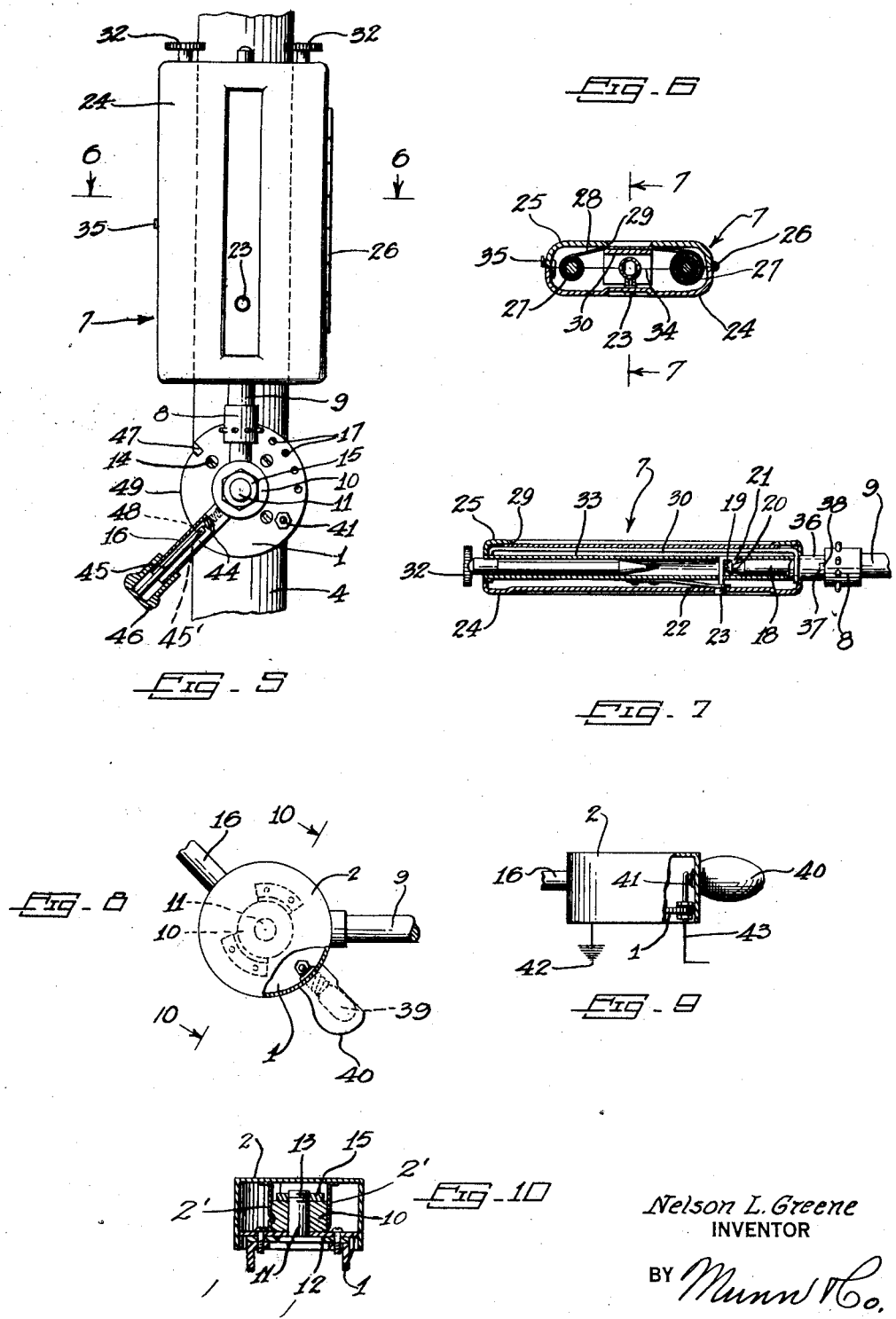
Nelson L. Greene
INVENTOR
BY Munn & Co.
ATTORNEYS Patented May 2, 1933

1,906,576

UNITED STATES PATENT OFFICE

NELSON L. GREENE, OF CHICAGO, ILLINOIS

SUPPORT FOR RECORDING DEVICES

Application filed December 22, 1930. Serial No. 504,134.

My invention relates to improvements in recording devices, and it consists in the combinations, constructions, and arrangements herein described and claimed.

An object of my invention is to provide a recording device in which certain improvements are embodied over that disclosed in my Patent No. 1,767,824, issued June 24, 1930. The patented device constitutes a recording device which is attachable to an instrument board of a vehicle, particularly an automobile, and in which means is provided whereby the record structure may be swung from behind the instrument board to a position in front thereof for permitting records to be entered thereon.

A further object is to provide a recording device in which novel means is employed whereby a complete record of various items, such as the amount of oil used, mileage, cost of gas, and sundry matters may be kept, and in which means is provided whereby the device may be easily and quickly connected with a steering column of a vehicle.

A further object is to provide a device of the type described in which novel means is employed whereby the device may be aligned with the steering column when not in use, and in such a manner that the device is practically invisible, and in which means is further provided whereby the device may be shifted to a position where entries may be conveniently made.

A further object is to provide a device of the type described in which novel means is employed for moving the recording device from a position in alignment with the steering post and to an angular position with respect thereto, and in which the movement of said device from its aligned position with the steering column to a recording position consummates a closing of an electrical circuit through a lamp associated with said device.

A further object is to provide a simple mechanism for containing a movable band of paper or the like, and in which means for containing and protecting said band is also constructed in a manner whereby a pencil may be associated therewith in a convenient manner.

Other objects and advantages will appear in the following specification, and the novel features of the invention will be particularly pointed out in the appended claims.

My invention is illustrated in the accompanying drawings, forming part of this specification, in which Figure 1 is a side elevation of a steering column showing my invention mounted thereon, Figure 2 is a sectional view taken along the line 2—2 of Figure 1, Figure 3 is an enlarged detail view showing the device in a recording position upon the steering column, Figure 4 is a view of the structure shown in Figure 3 taken from a different angle, Figure 5 is a top plan view of the recording device when positioned as shown in Figure 1, Figure 6 is a sectional view taken along the line 6—6 of Figure 5, Figure 7 is a longitudinal sectional view of the casing containing the record tape, Figure 8 is a detail view of the gear housing, partly in section, Figure 9 is a side elevation of the same, and Figure 10 is a sectional view taken along the line 10—10 of Figure 8.

In carrying out my invention, I make use of a stationary plate 1, see Figures 9 and 10, which may be enclosed within a rotatable casing 2 and connected with a supporting member 3, see Figure 3. The supporting member 3 may be positioned upon a steering column 4 and secured thereto by means of a band 5. The ends of the band may be clamped together by means of a screw or bolt 6. The construction permits the positioning of the device at any place upon the steering column to the convenience of the user.

The normal position of the device is shown in Figures 1 and 5. In this view, the record mechanism 7 is aligned with the steering column and positioned upon that side of the column opposite the driver of the vehicle. The arrangement is such that the mechanism is practically hidden from view. Means for moving the record mechanism from its aligned position to a position such as that shown in Figure 3, which is approximately at right angles to the steering column, consists of a gear 8 rotatably mounted upon a shaft portion 9 connected with a block 10 rotatably mounted upon a pin 11. The pin is provided with a flange 12 which bears against one side of the disc 1. The pin projects through an opening in the disc and is threaded upon its free end as indicated at 13. The flange 12 and the supporting member 3 may be rigidly connected with the disc through the medium of screws 14, see Figures 4 and 5. The block 10 is held in position upon the pin 11 by means of a nut 15 which is positioned upon the threaded end of the pin.

In Figures 4 and 5 I have shown the block as having a handle 16 connected therewith. The handle is arranged for rotating the block 10 upon the pin 11 for moving the record mechanism 7 from one position to another, as will be explained later.

The disc 1 is provided with openings 17 within which the teeth associated with the gear 8 project when the lever or handle 16 is moved. It will be noted that any movement of the handle 16 for rotating the block 10 on the pin 11 will cause a rotation of the gear 8 on the shaft portion 9 by reason of the fact that the disc 1 is fixed upon the steering column. The shaft portion 9 is extended beyond the gear 8 as indicated at 18. This portion is preferably slightly reduced in diameter and is provided with a tapered head 19 and a groove 20 for receiving a catch member 21, as shown in Figure 7. The catch member is connected with a spring 22 and is provided with a button 23 which permits the end of the member to be pushed away from the head 19 for releasing the shaft portion 18. At this time the record mechanism may be detached from the shaft portion.

Referring to Figures 3, 6, and 7, it will be noted that the record mechanism comprises a casing formed from sections 24 and 25 which are hingedly connected as at 26. Rollers 27 may be positioned within the casing for receiving portions of a band 28 upon which various items may be entered, as indicated in Figure 3. The section 25 is provided with an opening 29 for exposing a portion of the band 28, as shown.

A strip 30 passes across the casing for providing a rigid bearing surface, against which the band may be properly supported when making entries thereon. The section 25 may be provided with indicia 31 along one edge of the opening. The indicia may be arranged in various formations and preferably in such a manner as to align with the lining upon the band 28. The rollers (preferably one end of each) may project beyond one end of the casing, as shown in Figure 3, for receiving knob portions 32. The knobs permit the band to be shifted.

In Figure 7, I have shown the casing as being provided with a tube 33 which extends the entire length of the casing and is rigidly connected with one of the sections. The ends of the strip 30 are bent as shown in Figure 6 and are provided with openings for receiving the ends of the tube 33. The end portions may be welded or riveted to the sections 24 and 25. It will be noted in referring to Figure 6 that the end portions are split as at 34 for permitting one of the sections to be moved with respect to the other.

A suitable fastening device 35, see Figure 6, is employed for connecting the sections 24 and 25. The tube 33 is of a diameter which permits the portion 18 of the shaft 9 to be easily inserted therein. The tube 33 is the means for rotatably mounting the record device on the extended portion 18 of the shaft 9 and is rotatable with respect to the shaft 9. One end of the tube projects slightly beyond the end of the casing, as indicated at 36, see Figure 7, and is provided with a slot 37 for receiving a lug 38 associated with the gear 8. When the record device is connected with the shaft 9 as shown in Figure 7, rotation of the gear 8 will of course cause a similar movement of the record device. Means for illuminating the exposed portion of the band 28 consists in the provision of a lamp 39 which is carried by the cover 2. The lamp is enclosed within a reflector 40 for projecting light upon the exposed portion of the band. The cover 2 is provided with openings for receiving the handle 16 and the shaft 9. The cover 2 may be provided with projecting portions 2', as shown in Figure 10, which extend over the block 10 for detachably connecting the cover 2 with the block. Thus it will be seen that the cover 2 is rotatable with the block 10 and with respect to the disc 1. The lamp 39 is moved into electrical contact with a terminal 41 carried by the disc 1. The terminal is preferably insulated therefrom as shown in Figure 9. The disc may be grounded as at 42, while the terminal may be connected with a source of current through the medium of a conductor 43. The circuit is closed through the lamp whenever the record device is positioned as shown in Figure 3.

The handle 16, see Figure 5, is hollow in construction and contains a spring 44 which is connected with one end of a rod 45 having a head 46 slidably mounted upon the end of the handle. The rod 45 may be provided with a pin or lug 45' which may be positioned within recesses 47 and 48 in the edge of the disc 1. The disc between the recesses is cut out as shown at 49. The recesses permit the handle 16 to be rigidly secured in either of its shifted positions. The handle may be released by pulling outwardly upon the head 46 which moves the pin out of engagement with its associated recess.

From the foregoing description of the various parts of the device, the operation thereof may be readily understood. Normally, the record device is positioned as shown in Figure 5, which is a position in alignment with the steering column and with the section 25 facing the column so that the opening 29 is of course on the bottom. When it is desired to make an entry, as when a certain amount of oil or gas has been put in the vehicle, the lever 16 is moved to the position shown in Figure 4, thereby causing the record device to be moved to the position shown in Figures 3 and 4. At this time the opening 29 exposes the band 28 and the casing is positioned at an angle which permits entries to be easily made upon the band. The rotation of the block 10 by means of the handle 16 about the pin 11 as its axis causes a rotation of the gear 8. Such rotation, in turn, rotates and shifts the record device from a position in alignment with the steering column to that shown in Figure 3, or vice versa.

In Figure 7 I have shown a pencil as being inserted in the tube 30. The tube serves a double function in that it provides a convenient means for supporting the pencil and at the same time serves as a medium for detachably connecting the casing with the shaft 9. The casing may be easily detached by merely pressing upon the button 23, as previously stated. The lamp 39 is illuminated whenever the record device is shifted to a recording position.

I claim:

1. In a recording device for automotive vehicles, a plate member connected with a support and provided with a central opening therein, a stationary shaft extending through the opening and connected with the plate member, a collar rotatably mounted on the shaft, an auxiliary shaft connected with the collar and radially extending with respect thereto, a wheel mounted on the auxiliary shaft and provided with teeth receivable in openings in the plate member, said auxiliary shaft having a recording instrument connected therewith, said recording instrument being rotatable with respect to the auxiliary shaft, means for connecting the toothed wheel with the recording instrument for rotating the recording instrument when the wheel is rotated, and handle means connected with the collar for rotating the same.

2. In a recording device for automotive vehicles, a plate member connected with a support and provided with a central opening therein, a stationary shaft extending through the opening and connected with the plate member, a collar rotatably mounted on the shaft, an auxiliary shaft connected with the collar and radially extending with respect thereto, a wheel mounted on the auxiliary shaft and provided with teeth receivable in openings in the plate member, said auxiliary shaft having a recording instrument connected therewith, said recording instrument being rotatable with respect to the auxiliary shaft, means for connecting the toothed wheel with the recording instrument for rotating the recording instrument when the wheel in rotated, and handle means connected with the collar for rotating the same, said plate member being provided with recesses and catch means associated with the handle and receivable in the recesses for retaining the recording instrument in given positions.

3. In a recording device for automotive vehicles, a stationary member, means for connecting the stationary member to a support, a stationary shaft medially positioned with respect to the stationary member and connected therewith, a collar member rotatably mounted on the stationary shaft and provided with a radially extending arm, a radially extending handle portion connected with the collar member for rotating the same, and a wheel rotatably mounted on the arm and provided with teeth receivable in openings in the stationary member whereby said toothed wheel may be rotated on the arm when the collar member is rotated.

4. In a recording device for automotive vehicles, a stationary member, means for connecting the stationary member to a support, a stationary shaft medially positioned with respect to the stationary member and connected therewith, a collar member rotatably mounted on the stationary shaft and provided with a radially extending arm, a radially extending handle portion connected with the collar member for rotating the same, a wheel rotatably mounted on the arm and provided with teeth receivable in openings in the stationary member whereby said toothed wheel may be rotated on the arm when the collar member is rotated, and means rotatably mounted on the arm and connected with the toothed wheel for being rotated when the wheel is rotated.

5. In a recording device for automotive vehicles, a stationary member, means for connecting the stationary member to a support, a stationary shaft medially positioned with respect to the stationary member and connected therewith, a collar member rotatably mounted on the stationary shaft and provided with a radially extending arm, a radially extending handle portion connected with the collar member for rotating the same, a wheel rotatably mounted on the arm and provided with teeth receivable in openings in the stationary member whereby said toothed wheel may be rotated on the arm when the collar member is rotated, and catch means connected with the handle portion and receivable in recesses in the stationary member for retaining the collar member in given positions.

6. In a recording device for automotive vehicles, a stationary member, means for connecting the stationary member to a support, a stationary shaft medially positioned with respect to the stationary member and connected therewith, a collar member rotatably mounted on the stationary shaft and provided with a radially extending arm, a radially extending handle portion connected with the collar member for rotating the same, a wheel rotatably mounted on the arm and provided with teeth receivable in openings in the stationary member whereby said toothed wheel may be rotated on the arm when the collar member is rotated, catch means connected with the handle portion and receivable in recesses in the stationary member for retaining the collar member in given positions, and means rotatably mounted on the arm and connected with the toothed wheel for being rotated when the wheel is rotated.

NELSON L. GREENE.